Jan. 26, 1932.  J. LIND  1,842,454
UNDERWATER CUTTING TORCH
Filed Jan. 10, 1929
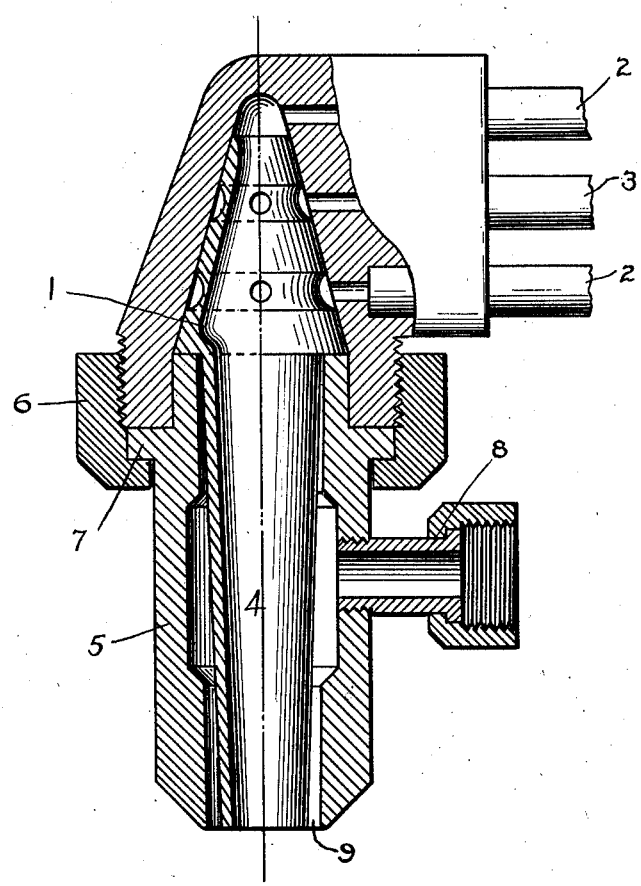
John Lind
INVENTOR
BY
ATTORNEY Patented Jan. 26, 1932

1,842,454

UNITED STATES PATENT OFFICE

JOHN LIND, OF BROOKLYN, NEW YORK

UNDERWATER CUTTING TORCH

Application filed January 10, 1929. Serial No. 331,575.

(GRANTED UNDER THE ACT OF MARCH 3, 1883, AS AMENDED APRIL 30, 1928; 370 O. G. 757)

My invention relates broadly to cutting torches and more particularly to an attachment therefore for maintaining a flame ejected therefrom constant while operating under water.

An object of my invention is to provide a torch of the character described that will operate under water as well as above water.

Another object of my invention is to provide a torch of the character described in which the flame emitting therefrom is insulated from surrounding water.

With the above and other objects in view the invention consists in the construction, combination and arrangement of parts as will be described more fully hereinafter.

Reference is to be had to the accompanying drawing forming a part of this specification wherein is illustrated a longitudinal view of a torch head, partially in section.

Referring more particularly to the drawing, 1 indicates a mixing chamber to which are admitted suitable jets of the gases used in the operation of the torch, as, for example, oxygen and hydrogen. If oxygen and hydrogen are used, the oxygen is admitted through the connections 2 and the hydrogen through the connection 3. These connections 2 and 3 lead to the sources of supply of the oxygen and hydrogen respectively. From this chamber the mixture passes through and issues from the tip 4, after being ignited, as a flame adapted to cut metal, as is well known in the art.

The mixing chamber, as shown in the drawing, is formed integral with the tip 4, but, if desired, it may be made as a separate part suitably attached to the tip. In either case, the tip and mixing chamber combine as one unitary structure that provides a means for commingling the gases in the tip unit. As shown, the mixing chamber provides an enlarged head for the tip, and assists in maintaining the tip in the torch head.

When it is desired, however, to utilize the torch under water, it is necessary to provide a means for insulating the flame from the surrounding water so that it will not be extinguished, but will burn constantly until extinguished by the operator. This I accomplish by means of a jet of air under pressure which completely encircles the flame, as will now be explained.

A sleeve or jacket 5, surrounding the tip and spaced therefrom, is brought into airtight contact with the torch head housing of the mixing chamber by the union nut 6 that engages with threads on the said housing and with a shoulder 7 on the sleeve. Air under pressure is admitted to the sleeve at the side through a connection 8 from any available supply source. The air then escapes through an annular opening 9 between the torch tip 4 and the end of the sleeve 5 in the form of a cylindrical wall encircling the flame, insulating it from the surrounding water, and thus preventing the extinguishment of the flame.

It will be understood that the above description and accompanying drawing comprehend only the general and preferred embodiment of my invention and that various minor changes in details of construction, proportion and arrangement of parts may be made within the scope of the appended claims and without sacrificing any of the advantages of my invention.

The invention described herein may be manufactured and used by or for the Government for governmental purposes without the payment to me of any royalty thereon.

What I claim is:

1. A cutting torch head including a body portion, a tip provided with an enlarged head forming a mixing chamber, inlets to said chamber, a sleeve spaced from the tip providing a chamber therebetween, an inlet to the intervening chamber for air under pressure, and means for assembling the tip and sleeve to the head.

2. A cutting torch head including a body portion, a combined tip and mixing chamber, inlets to said chamber, a sleeve spaced from the tip providing a chamber therebetween, an inlet to the intervening chamber for air under pressure, and means for assembling the tip and sleeve to the head.

3. A cutting torch head including a body portion, a tip, a chamber for commingling gases in the tip structure, means for conducting the gases to said chamber, a sleeve spaced from the tip providing a chamber therebetween, an inlet to the intervening chamber for air under pressure, and means for assembling the tip and sleeve to the head.

JOHN LIND.